(12) United States Patent
Sigg

(10) Patent No.: US 6,397,138 B1
(45) Date of Patent: May 28, 2002

(54) SAFETY SYSTEM FOR AN AUTOMATIC TRANSMISSION

(75) Inventor: Peter Sigg, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 09/319,613
(22) PCT Filed: Dec. 11, 1997
(86) PCT No.: PCT/EP97/06915
§ 371 (c)(1),
(2), (4) Date: Jun. 9, 1999
(87) PCT Pub. No.: WO98/27368
PCT Pub. Date: Jun. 25, 1998

(30) Foreign Application Priority Data

Dec. 17, 1996 (DE) .......................... 196 52 457

(51) Int. Cl.[7] .................. G06F 17/00; G06F 19/00; G06F 7/00; F16H 61/16; B60K 41/04
(52) U.S. Cl. ................... 701/61; 701/62; 701/66; 477/109; 477/115; 477/116; 477/125
(58) Field of Search ................. 701/61, 62, 66; 477/109, 115, 116, 125, 110, 117

(56) References Cited

U.S. PATENT DOCUMENTS

| | | | |
|---|---|---|---|
| 4,933,850 A | * | 6/1990 | Wheeler .................. 701/56 |
| 5,364,317 A | * | 11/1994 | Amemiya ................. 475/132 |
| 5,558,599 A | | 9/1996 | Tsukamoto et al. ......... 477/116 |
| 5,771,477 A | * | 6/1998 | Showalter et al. ............ 701/51 |

FOREIGN PATENT DOCUMENTS

| | | |
|---|---|---|
| DE | 44 20 930 A1 | 12/1995 |
| EP | 0 406 712 A2 | 1/1991 |
| EP | 0 650 000 A1 | 4/1995 |
| EP | 0 677 684 A1 | 10/1995 |
| EP | 0 773 391 A1 | 5/1997 |
| GB | 2 290 359 A | 12/1995 |

OTHER PUBLICATIONS

Dach, H. and P. Köpf, *Moderne Industrie*, 1994 pp. 58–61.
Rösch, Rudolf and Gerhard Wagner, *ATZ Automobiltechnische Zeitschrfit* 97, "Die elektronische Steuerung des automatischen Getriebes W5A 330/580 von Mercedes–Benz", 1995, pp. 736–748.

* cited by examiner

Primary Examiner—Jacques H. Louis-Jacques
Assistant Examiner—Brian J Broadhead
(74) Attorney, Agent, or Firm—Davis & Bujold, P.L.L.C.

(57) ABSTRACT

For an automatic transmission (2), a safety system is proposed in which a virtual reduction ratio is calculated when a driver moves the selector lever from a drive position to neutral and then from neutral back to a drive position. The virtual reduction ratio is then compared with the reduction ratio resulting from a shift characteristic field. In case of divergence, the virtual reduction ratio is assigned to a characteristic field having a linearly constant reduction ratio surrounded by a reduction ratio range. The electronic control unit (5) selects as a set reduction ratio, the one containing in its range the virtual reduction ratio.

10 Claims, 4 Drawing Sheets

SAFETY SYSTEM FOR AN AUTOMATIC TRANSMISSION

The invention concerns a safety system for an electro-hydraulically controlled automatic transmission preferably driven by an internal combustion engine and whose reduction ratio is determined via a shift characteristic field by an electronic control unit depending at least on a throttle valve position and a transmission output speed wherein a driver can engage the control of the automatic transmission by means of a selector lever.

BACKGROUND OF THE INVENTION

It is known from the prior art that a driver prevents certain shifts by the position of a selector lever. For example, if the selector lever is in the three position, then shifts to the fourth and fifth gears are prevented. Typical cases of this are downhill drives. As relevant prior art can be taken into consideration in this connection, e.g., the book *Pkw-Automatgetriebe* by H. Dach and P. Kopf, Moderne Industrie Editing House, 1994, pages 58–61.

In the practice the following problem can now arise: If a driver at the end of the downhill drive inadvertently moves the selector lever from the three position to the neutral position, then there exists no more frictional connection between the transmission output and the transmission input. If at the same time the driver has actuated the accelerator pedal, then the speed of the internal combustion engine will very quickly increase in relation to the governed speed. If the driver now detects his error, he will try to shift the selector lever to a forward drive position. In other words, in the first shift from the three position to neutral, the clutch for the third gear will be opened. In the second shift from the neutral position to a forward drive position, the clutch for the third gear again closes. In this closing process, however, the speed of the internal combustion engine or the transmission input speed is forced from a high level to a low level, hence the third gear here. This elevated speed difference leads to a strong loading of the engaging clutch.

SUMMARY OF THE INVENTION

In view of the above, the invention is base on the problem of reducing the load of the engaging clutch for the above described case.

According to the invention, the problem is solved by the electronic control unit testing while driving whether there has occurred a first change on the selector lever from a drive position to a neutral position followed by a second change from the neutral position to the drive position, and the electronic control unit determining a virtual reduction ratio upon detection of the first change and the selector lever being in neutral position. The virtual reduction ratio is calculated from the quotient of the transmission input speed to the transmission output speed. With detection of the second change and a selector lever being in a drive position, the electronic control unit compares the virtual reduction ratio with the reduction ratio resulting from the shift characteristic field. In case of a divergence, the virtual reduction ratio is assigned to a characteristic field which has lines of constant reduction ratio surrounded by a reduction ratio range. As a consequence of this, the electronic control unit will determine a set reduction ratio whose range contains the virtual reduction ratio. The solution, according to the invention, offers the advantage that the same clutch, such as for the third gear, is not first opened and then closed again. The case can arise, that instead of the clutch for the third gear, the clutch for the second gear is closed. Thereby becomes reduced the speed difference or the shifting work of the engaging clutch.

In development of this, it is proposed that the reduction ratio ranges do not overlap and the electronic control unit forms a difference from the virtual reduction ratio and the possible reduction ratios of the automatic transmission when the virtual reduction ratio is between two ranges. As a consequence of this, the electronic control unit will select a set reduction ratio in which the difference results in a minimum.

It is proposed that upon detection of the first change and the selector lever being in the neutral position, the further curve of the virtual reduction ratio is forecast. In development of this, it is proposed that, at a first and second moment, a transmission input speed value be found and a gradient of the transmission input speed be determined therefrom. From the gradient of the transmission input speed, at the first moment, is now calculated a transmission input speed value that is to be expected at a third moment. From the transmission input speed value expected, the virtual reduction ratio is then forecast at the third moment. This development, according to the invention, takes into consideration the case when the driver immediately after having activated the neutral position, detects his error and simultaneously releases the accelerator pedal and shifts the selector lever to a forward drive position. Due to the release of the accelerator pedal, the speed of the internal combustion engine, or the transmission input speed, quickly becomes reduced. Since signal transit times appear between the issuance of a shift command by the electronic control unit and the actual closing of the clutch, it is possible, by applying the solution according to the invention, to obtain the advantage of a more accurate selection of the set reduction ratio.

DESCRIPTION OF THE PREFERRED EMBODIMENTS

Figure 1:
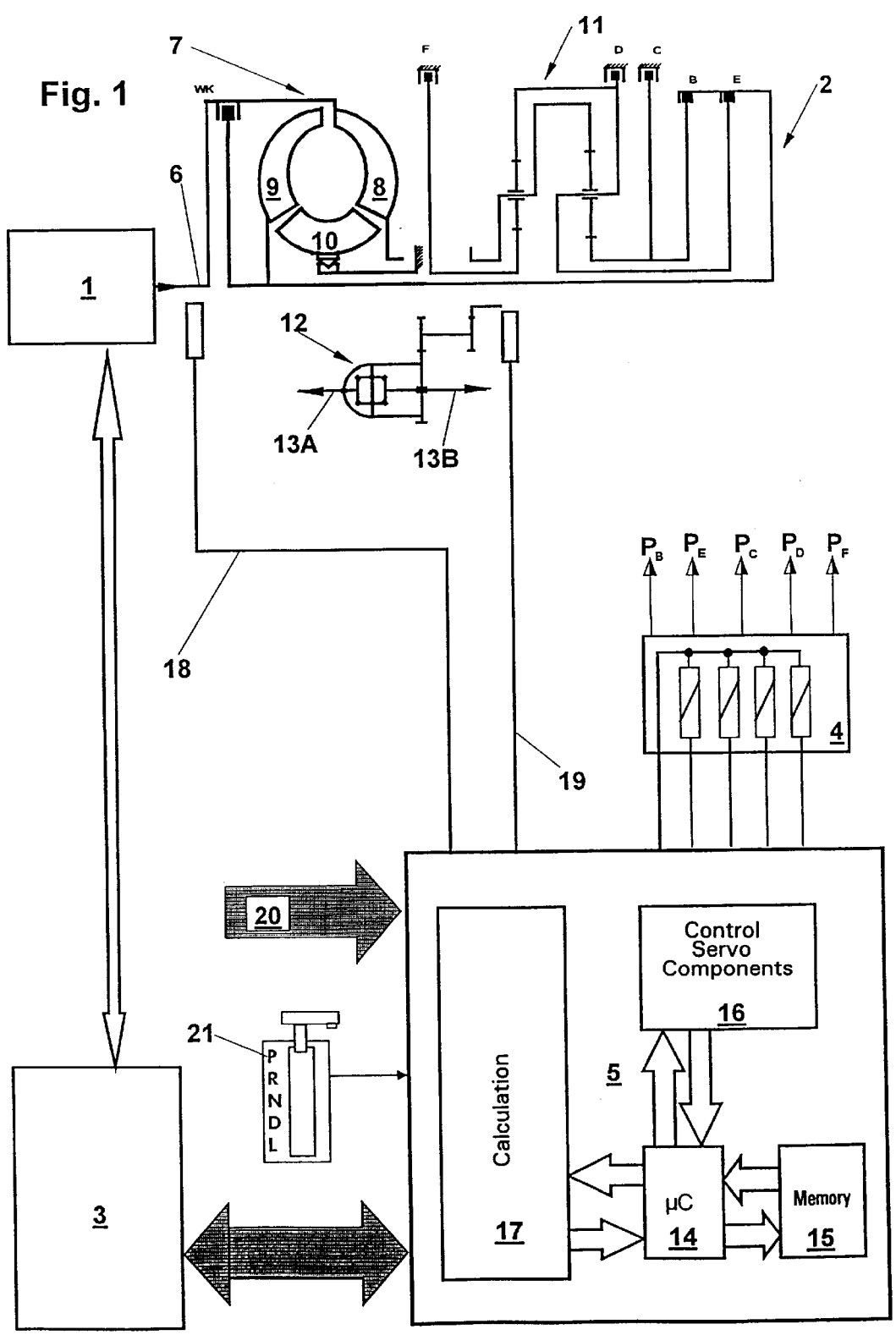
FIG. 1 is a system diagram.

FIG. 1 shows a system diagram with the following main parts: internal combustion engine 1, automatic transmission 2 and electronic control unit 5. The internal combustion engine 1 drives the automatic transmission 2 via an input shaft 6. The input shaft 6 is non-rotatably connected with a hydrodynamic converter 7 and drives the impeller 8 thereof. The hydrodynamic converter 7 is known to consist of the impeller 8, a turbine wheel 9 and a stator 10. Parallel to the hydrodynamic converter 7 is shown, without a reference numeral, a converter bridge clutch. When the converter bridge clutch is actuated, the turbine shaft rotates at the same speed as the input shaft 6. The turbine shaft leads further into a composite planetary transmission 11 consisting of two planetary gear pairs, the clutches, and brakes B to F. By an adequate clutch/brake combination, it is possible to adjust a gear step or a reduction ratio according to the following table:

| Gear | B | E | C | D | F |
|------|---|---|---|---|---|
| 1 | x |   |   |   | x |
| 2 |   | x |   |   | x |
| 3 | x | x |   |   |   |
| 4 |   | x | x |   |   |
| R | x |   |   | x |   | x: clutch/brake activated

Hereinafter the designation clutch will be used. But as it can clearly be seen from the table, thereby are meant the clutches and clutch/brake activated in the respective gear.

Since the mechanical part, the output results from the differential 12 and the two axle half shafts 13A and 13B, are not relevant for a better understanding of the invention, a detailed description is omitted.

The clutches and brakes B to F are controlled or regulated by the electronic control unit 5 via the hydraulic control unit 4. In the hydraulic control unit 4 are placed electromagnetic servo components and hydraulic valves. The hydraulic control unit 4 is usually an integral part of the automatic transmission 2. The function blocks micro-controller 14, memory 15, function block calculation 17, and function block control servo components 16, all of the electronic control unit 5, are shown in extensively simplified form. The memory 15 is usually designed as EPROM, EEPROM, or buffered RAM. The data relevant to the transmission are deposited in the memory 15. The function block control servo components 16 serves to control the electromagnetic servo component in the hydraulic control unit 4. The function block calculation 17 serves to calculate the data relevant to shifting. The latter are determined from the input parameters 18 to 21. Input parameters 20 are, e.g., the signal of an accelerator pedal or throttle valve position, the temperature of the hydraulic fluid, etc. A selector lever is shown with the reference numeral 21. Such a selector lever usually has the positions P, R, N, D, three, two and one. By said selector lever, the driver can lock in certain reduction ratios of the transmission. For example, if the selector lever is in the three position, a shift to the fourth or fifth gear is prevented. The transmission input speed 18 (nT) and the transmission output speed 19 (nAB) are shown as additional input parameters for the control unit 5.

The internal combustion engine 1, shown in FIG. 1, is controlled by an electronic motor control unit 3. The latter is connected, via a bidirectional interface, with the electronic control unit 5 of the automatic transmission 2. Via said interface, shown without reference numeral in FIG. 1, motor operating parameters, for example, can be transmitted or a motor engagement performed by the electronic control unit 5.

Figure 2A:
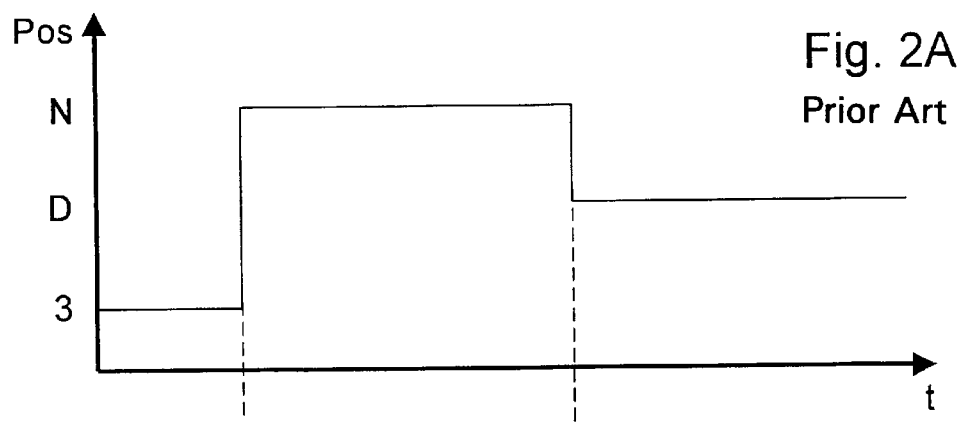
FIGS. 2A through 2C is a solution according to the prior art.
Figure 2B:
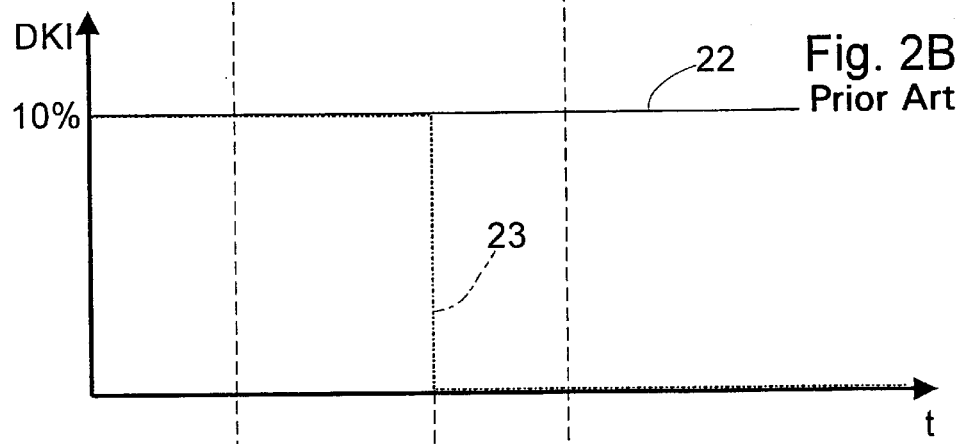
Figure 2C:
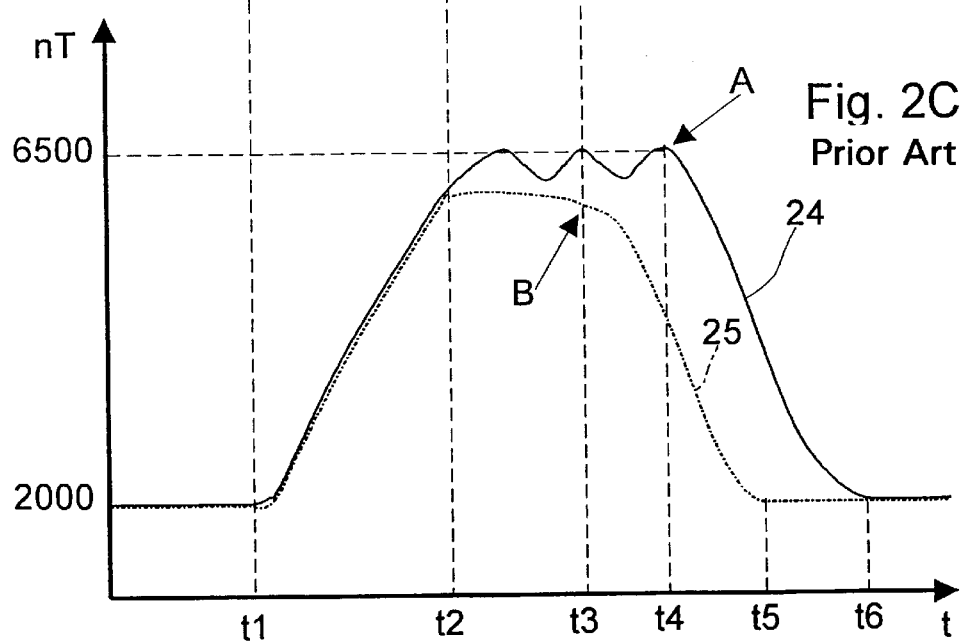

Turning now to FIGS. 2A to 2C, these figures show:

FIG. 2A the state of the selector lever (pos);

FIG. 2B the curve of the throttle valve position (DKI) and

FIG. 2C the curve of the transmission input speed (nT).

Two examples are shown in FIGS. 2B and 2C. The first example, with reference numeral 22, comprises the curve of the throttle valve position in FIG. 2B and corresponding thereto, with reference numeral 24, the curve of the transmission input speed in FIG. 2C. The second example comprises a curve of the throttle valve position according to reference numeral 23, and a curve of the transmission input speed with reference numeral 25, both shown in dotted line.

First example:

At the t1 moment, the driver actuates the selector lever and inadvertently shifts it from the three position to the neutral position. To this belongs the curve of FIG. 2A. It is assumed that during this operation the driver keeps the accelerator pedal at a constant value such as 10%, as shown in FIG. 2B with reference numeral 22. As a result of this first change, that is, from the three position to the neutral position, the frictional connection between transmission output and transmission input is dissolved, since the clutch for the third gear is open. Consequently, the transmission input speed nT, reference numeral 24 in FIG. 2C, increases. In this example, the transmission input speed nT reaches the governed speed value of 6,500 revolutions. At the t3 moment, the driver detects his inadvertence and changes the selector lever from the N position to the forward drive D position. At the t4 moment, point A, the now engaging clutch of the third gear begins to close so that as a result thereof, the transmission input speed nT decreases. The temporary offset between t3 and t4 results from signal transit times between the output command of the electronic control unit 5 and the filling operation of the third gear clutch. At the t6 moment, the clutch is closed and the transmission input speed nT has again reached the initial speed value of 2,000 revolutions. As results from the transmission input speed curve, reference numeral 24 in FIG. 2C, is that the closing clutch must eliminate said speed difference, the amount here being 4,500 revolutions. This means a high load for the clutch.

Second example:

At the t1 moment, the driver shifts the selector lever from the three position to the neutral position. In this example, it is assumed that at the t2 moment, the driver detects his inadvertence due to the sharply increasing transmission input speed, reference numeral 25 in FIG. 2C, and as a reaction thereto, releases the accelerator pedal. For this case, the curve of the accelerator pedal position is provided with the reference numeral 23. Due to the inherent dynamics of the internal combustion engine, the transmission input speed nT does not immediately diminish after the t2 moment. At the t3 moment, the driver shifts the selector lever from the N position to the D position. As a result of this, the curve of the transmission input speed nT in point B will change. At the t5 moment, as a result of the closed clutch of the third gear, the transmission input speed has again reached the output speed of 2,000 revolutions. As can be seen from this example, the clutch must here, like in the first example, eliminate a small speed difference. Nevertheless, this means an increased load for the clutch.

Figure 3:
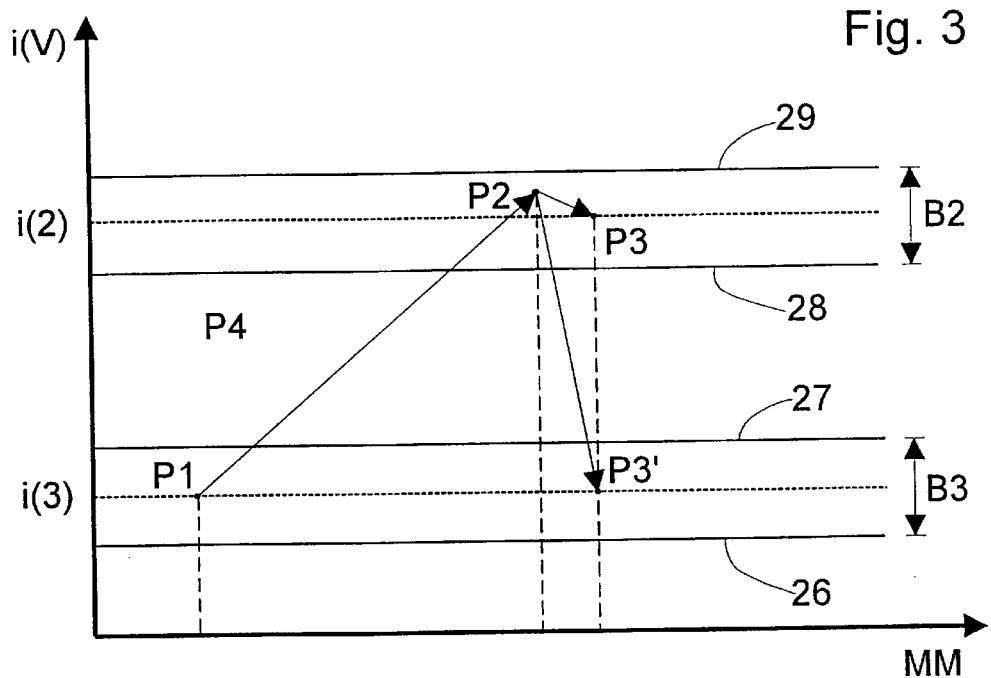
FIG. 3 is a first characteristic field.

In FIG. 3 is shown a first characteristic field. It shows as abscissa values the torque (MM) produced by the internal combustion engine and as ordinate values, the reduction ratios of the automatic transmission 2. Parallel to the abscissa are extend dotted lines of constant reduction ratio designated here as i(3), i(2), etc., which correspond to the gear steps of the automatic transmission. The lines of the constant reduction ratio are surrounded by a reduction ratio range. To the line of constant reduction ratio i(3) belongs the reduction ratio range B3 with the lower limit 26 and the upper limit 27. To the line of constant reduction ratio i(2) belongs the reduction ratio range B2 with the lower limit 28 and the upper limit 29.

The course of the process is the following: The selector lever is in the 3 position. It is assumed that the third gear is active which is designated in FIG. 3 as point P1, which is on the line i(3). If a first change is now effected, that is, the driver inadvertently shifts the selector lever from the 3 position to the neutral position, the clutch for the third gear opens. Since now there no longer exists any mechanical connection between transmission output and transmission input, the speed of the internal combustion engine or the transmission input speed nT will sharply increase. According to the invention, the process proposes that the electronic control unit will now determine a virtual reduction ratio from the quotient of the transmission input speed nT, to the transmission output speed nAB, iV=nT/nAB. This is shown with the change at point P2.

If now a second change takes place, that is, the driver detects his error and shifts the selector lever from the neutral position to a forward drive position, then according to the prior art as described above in FIGS. 2A through 2C, the transmission input speed nT is led back to the initial value. The reason for this is that the clutch for the third gear is closed and now a strong connection again exists between the transmission output and the transmission input. The process, according to the invention, now provides that the electronic control unit 5 determines a set reduction ratio whose reduction ratio range contains the virtual reduction ratio. In FIG. 3, this is the reduction ratio range B2 with the set reduction ratio i(2). In other words, in this example what is activated is not the clutch for the third gear, but the clutch for the second gear. The speed difference for the clutch of the second gear here is less thus this clutch must perform less shifting work.

If the calculated virtual reduction ratio is outside the range limits, e.g. the point P4, then the electronic control unit calculates a difference from the virtual reduction ratio and the possible reduction ratios of the automatic transmission. Thereafter, the electronic control unit determines a set reduction ratio whose difference results in a minimum. In FIG. 3, this would be the reduction ratio i(2).

Additionally, it can be provided that upon detection of the first change of the selector lever 21 being in the neutral position, the further curve of the virtual reduction ratio iV can be forecast. To this end, at a first and second moment, t1 and t2, a transmission input speed value nT is detected from which a gradient of the transmission input speed GRAD=nT(t1)−nT(t2)/(t1−t2) is determined. From the GRAD gradient and the transmission input speed nT at the first moment (t1), a transmission input speed value to be expected is then calculated at a third moment t3, nT(t3)= nT(t1)−GRAD(t3−t1) and therefrom the virtual reduction ratio iV is forecast at the third moment iV=nT(t3)/nAB. The third moment, t3, is determined from the moment at which the second change is detected by the electronic control unit 5 and from a signal transit time resulting from the temporary deceleration between output command of the electronic control unit 5 and the actually self-adjusting fixed reduction ratio i(K).

Figure 4:
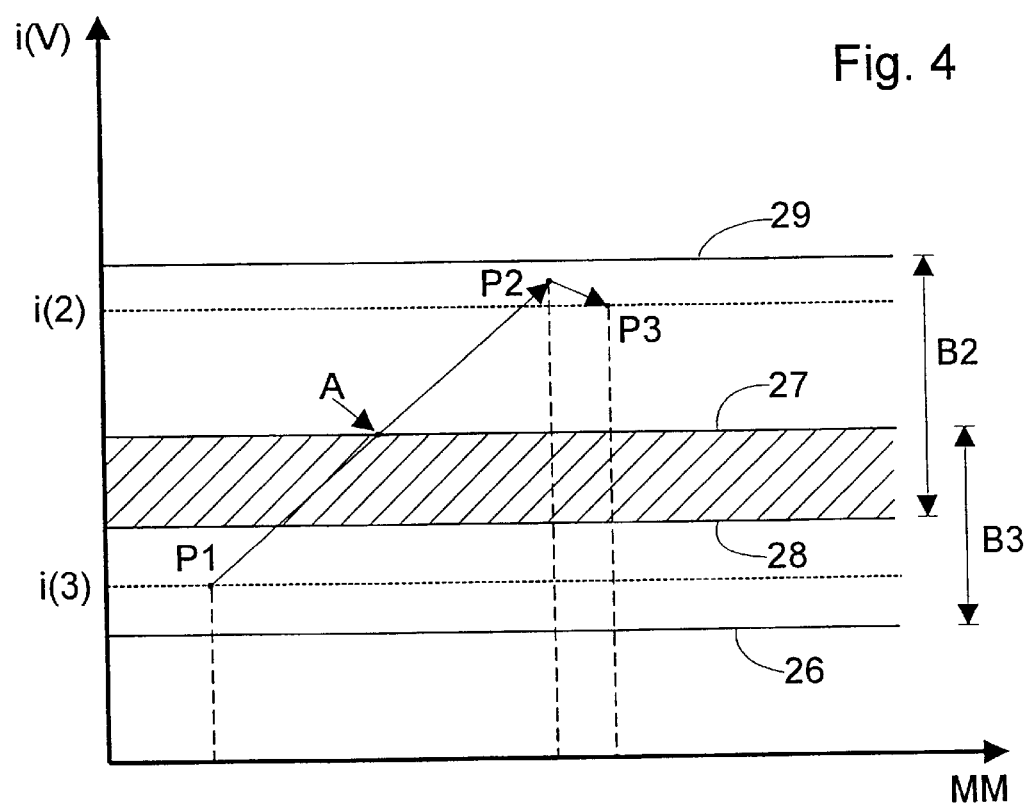
FIG. 4 is a second characteristic field.

A second characteristic field is shown in FIG. 4. It differs from the first characteristic field of FIG. 3 in that the range limits overlap. To the line of constant reduction ratio i(3) belongs the range B3 with the lower limit 26 and upper limit 27. To the line of constant reduction ratio i(2) belongs the range B2 with the lower limit 28 and the upper limit 29. If a first change takes place, here again from the 3 position and the point P1, the curve of the transmission input speed nT changes in the direction of point P2. The difference from the first characteristic field now consists in that the electronic control unit does not select the reduction ratio as a set reduction ratio until the virtual reduction ratio has left the hysteresis band which resulted from the overlapping ranges. As shown in FIG. 4, the virtual reduction ratio exceeds, at point A, the range upper limit of the reduction ratio i(3). In other words, starting from point A, after the second change has taken place, the electronic control unit determines as a set reduction ratio the second gear as i(2) with the point P3.

Should the transmission input speed change, departing from point P2 in the direction of point P1, it would be defined as set reduction ratio i(3) when falling below the line 28.

Figure 5A:
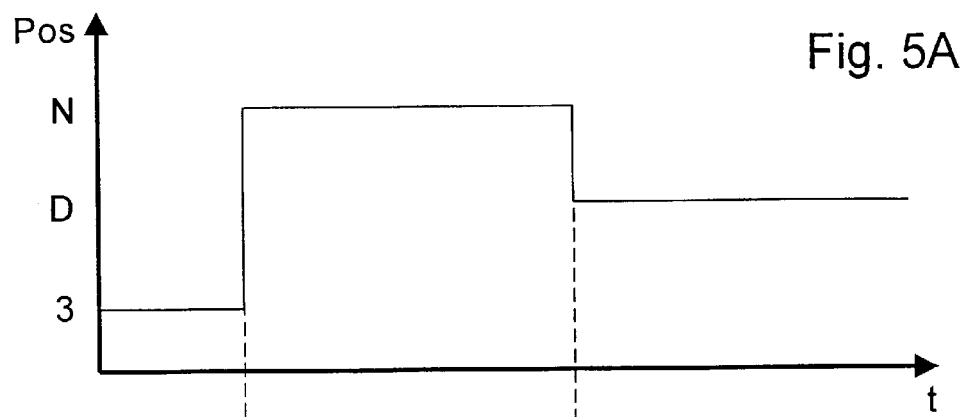
FIG. 5 is a solution according to the invention
Figure 5B:
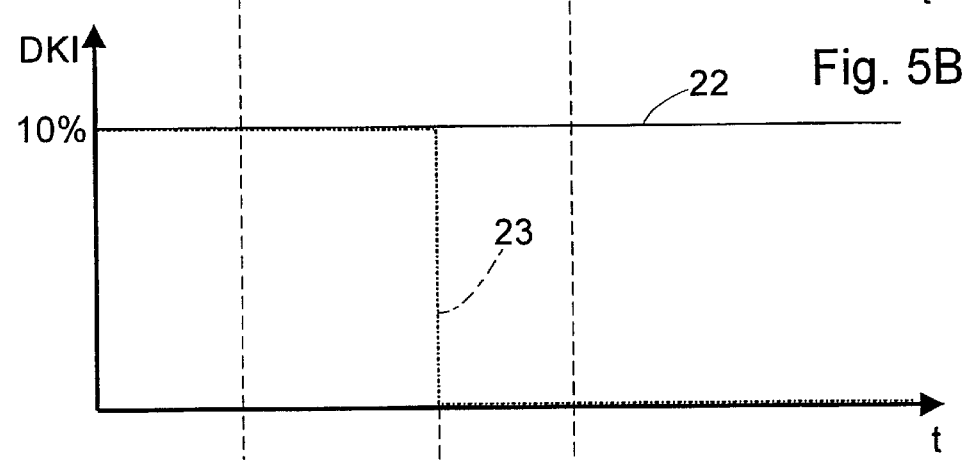
Figure 5C:
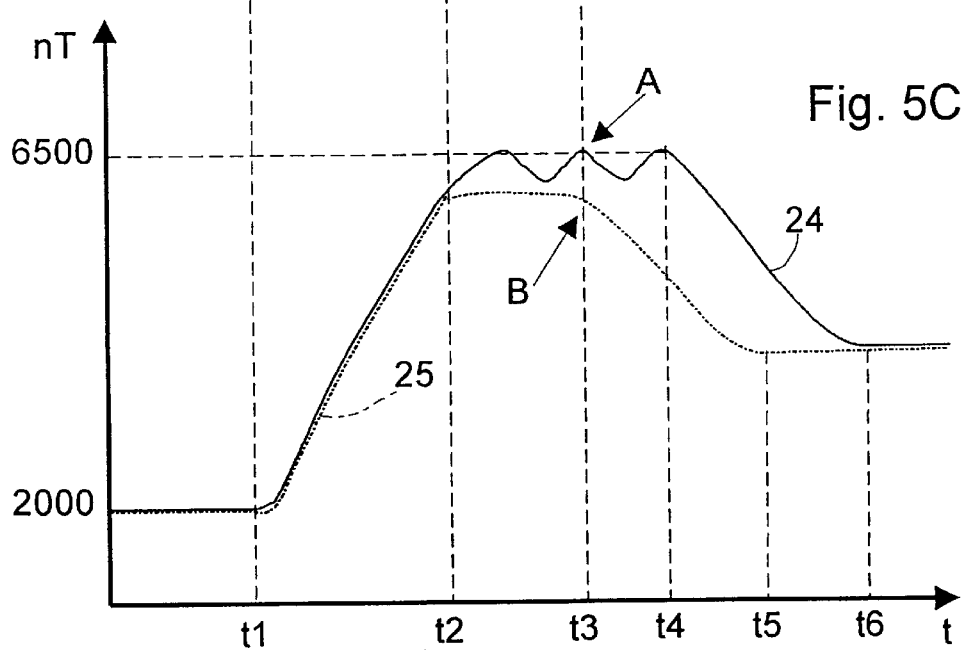

In FIG. 5 is shown the application of the process according to the invention. Turning now to FIGS. 5A through 5C, these figures show.

FIG. 5A the signal of the selector lever;

FIG. 5B the curve of the throttle valve position; and

FIG. 5C the curve of the transmission input speed nT.

In each of FIGS. 5B and 5C are shown two examples. In the first example it is assumed that the driver has kept the accelerator pedal at a constant 10% value. In FIG. 5B, this curve is shown with the reference numeral 22. To this example belongs in FIG. 5C, the corresponding curve of the transmission input speed nT with the reference numeral 24. In the second example, it is assumed that the driver, after the transmission is in neutral, detects his inadvertence and releases the accelerator pedal. In FIG. 5B, this curve is shown in dotted lines with the reference numeral 23. To this example belongs in FIG. 5C, the transmission input speed curve with the reference numeral 25, also shown in dotted lines.

First example:

At the t1 moment, the driver inadvertently moves the selector lever from the 3 position to the N position. Since the friction connection now no longer exists between the transmission output and the transmission input, the transmission input speed nT, reference numeral 24, will sharply increase. In this example, it has been assumed that the transmission input speed nT reaches the governed speed of 6,500 revolutions. At the t3 moment, the driver will now move the selector lever from the N position to the D position. Due to the signal transit time, the time period t3 to t4 elapses before the clutch of the set reduction ratio begins to close. At the t6 moment, the clutch is closed and the transmission input speed nT has reached the new synchronization point. This can be, for ex., the synchronization point of the second gear.

Second example:

At the t1 moment, the driver inadvertently moves the selector lever from the 3 position to the N position. Thereby the transmission input speed nT, reference numeral 25, begins to increase very sharply. At the t2 moment, the driver detects his inadvertence and releases the accelerator pedal, signal curve 23, thus starting from the moment the curve of the transmission input speed nT does not substantially increase any more. At the t3 moment, the second change takes place, that is, the driver moves the selector lever from the N position to the D position. At point B, the curve of the transmission input speed changes in the direction of the new synchronization point. The new synchronization point is reached at the t5 moment. Likewise, this can be the second gear. As results from the comparison of FIG. 5 with FIG. 2, the clutch to be engaged after the second change has to perform substantially reduced shifting work.

| Reference numerals | |
|---|---|
| 1 | internal combustion engine |
| 2 | automatic transmission |
| 3 | electronic motor control unit |
| 4 | hydraulic control unit |
| 5 | electronic control unit |

-continued

Reference numerals

| | |
|---|---|
| 6 | input shaft |
| 7 | hydrodynamic converter |
| 8 | impeller |
| 9 | turbine wheel |
| 10 | stator |
| 11 | composite planetary transmission |
| 12 | differential |
| 13A | axle half shaft |
| 13B | axle half shaft |
| 14 | micro-controller |
| 15 | memory |
| 16 | function block control servo components |
| 17 | function block calculation |
| 18 | transmission input speed |
| 19 | transmission output speed |
| 20 | input parameters |
| 21 | selector lever |
| 22 | DKI curve, Example 1 |
| 23 | DKI curve, Example 2 |
| 24 | nT curve, Example 1 |
| 25 | nT curve, Example 2 |
| 26 | lower limit |
| 27 | upper limit |
| 28 | lower limit |
| 29 | upper limit |

What is claimed is:

1. A safety system for an electrohydraulically controlled automatic transmission (2) driven by an internal combustion engine (1), said safety system comprising:
   an electronic control unit (5) for determining a reduction ratio (i(K), K=1 . . . 5) via a shift characteristic field (i(K)=f (DKI, nAB)), with said reduction ratio depending on a throttle valve position (DKI) and a transmission output speed (nAB), and each of said characteristic fields having a line of constant reduction ratio included within a reduction ratio range (B(K), K=1 . . . 5);
   a selector lever (21) coupled to the automatic transmission (2) for facilitating control of said automatic transmission (2) during use by a driver;
   said electronic control unit (5) including a mechanism for determining, while driving (nAB>limit value), whether a first change of said selector lever (21) occurs, from a forward driving position to a neutral position, and whether the first change is followed by a second change of the selector lever (21) from the neutral position to the forward driving position;
   said electronic control unit (5) includes means for deriving, upon detection of the first change and said selector lever (21) being moved to the neutral position, a virtual reduction ratio (iV) from a transmission input speed (nT) and the transmission output speed (nAB), and said electronic control unit, upon detection of the second change, including means for determining a set reduction ratio (iSOLL) with the set reduction ratio (iSOLL) containing the virtual reduction ratio (iV);
   when the virtual reduction ratio (iV) is between first and second reduction ratio ranges, said electronic control unit (5) including means for determining a first difference (DIFF) of the virtual reduction ratio (iV) and the first reduction ratio range and a second difference (DIFF) of the virtual reduction ratio (iV) and the second reduction ratio range; and
   said electronic control unit (5) including means for selecting the set reduction ratio (iSOLL) based upon a lesser of the first difference (DIFF) and the second difference (DIFF).

2. The safety system according to claim 1, wherein the electronic control unit includes means for selecting the set reduction ratio (iSOLL) only once the virtual reduction ratio (iV) is outside a hysteresis band overlapping the first and the second reduction ratio ranges (B(K)).

3. The safety system according to claim 1, wherein the safety system, upon detection of said selector lever (21) being in the neutral position and the first change, includes means for forecasting a further curve of the virtual reduction ratio (iV).

4. The safety system according to claim 3, wherein the safety system includes means for:
   ascertaining the transmission input speed (nT) from a first moment (t1) and a second moment (t2);
   determining a gradient (GRAD) of the transmission input speed (GRAD=(nT(t1)−nT(t2)/(t1−t2));
   calculating (nT(t3)=nT(t1)−GRAD(t3−t1)), from the gradient (GRAD) and the transmission input speed at the first moment (nT(t1)), a transmission input speed to be expected at a third moment (t3); and
   forecasting the virtual reduction ratio (iV) at the third moment (iV=nT(t3/nAB).

5. The safety system according to claim 4, wherein the safety system includes means for identifying the third moment (t3) upon said electronic control unit (5) determining that the second change has occurred, and a signal transit time resulting from a temporary deceleration between an output command of said electronic control unit (5) and the reduction ratio (i(K)).

6. A method for electrohydraulically controlling an automatic transmission (2) driven by an internal combustion engine (1), the method comprising the steps of:
   determining, via an electronic control unit (5), a reduction ratio (i(K), K=1 . . . 5) via a shift characteristic field (i(K)=f (DKI, nAB)), with said reduction ratio depending on a throttle valve position (DKI) and a transmission output speed (nAB), and each of said characteristic fields having a line of constant reduction ratio included within a reduction ratio range (B(K), K=1 . . . 5);
   coupling a selector lever (21) to the automatic transmission (2) for facilitating control of said automatic transmission (2) during use by a driver;
   determining, via said electronic control unit (5), while driving (nAB>limit value), whether a first change of said selector lever (21) occurs, from a forward driving position to a neutral position, and whether the first change is followed by a second change of the selector lever (21) from the neutral position to the forward driving position;
   deriving, via said electronic control unit (5), upon detection of the first change and said selector lever (21) being moved to the neutral position, a virtual reduction ratio (iV) from a transmission input speed (nT) and the transmission output speed (nAB), and said electronic control unit, upon detection of the second change, determining a set reduction ratio (iSOLL) with the set reduction ratio (iSOLL) containing the virtual reduction ratio (iV);
   when the virtual reduction ratio (iV) is between first and second reduction ratio ranges, determining via said electronic control unit (5) a first difference (DIFF) of the virtual reduction ratio (iV) and the first reduction ratio range and a second difference (DIFF) of the virtual reduction ratio (iV) and the second reduction ratio range; and
   selecting, via electronic control unit (5), the set reduction ratio (iSOLL) based upon a lesser of the first difference (DIFF) and the second difference (DIFF).

7. The method according to claim 6, further comprising the step of selecting the set reduction ratio (iSOLL) only once the virtual reduction ratio (iV) is outside a hysteresis band between the first and the second reduction ratio ranges (B(K)).

8. The method according to claim 6, further comprising the step of forecasting a further curve of the virtual reduction ratio (iV) upon detection of the first change and the selector lever (21) being in the neutral position.

9. The method according to claim 6, further comprising the steps of:

ascertaining the transmission input speed (nT) from a first moment (t1) and a second moment(t2);

determining a gradient (GRAD) of the transmission input speed (GRAD=(nT(t1)−nT(t2)/(t1−t2));

calculating a transmission input speed expected at a third moment (t3), from the gradient (GRAD) and the transmission input speed at the first moment, using the formula (nT(t1)), (nT(t3)=nT(t1)−GRAD(t3−t1)); and forecasting the virtual reduction ratio (iV) at the third moment (iV=nT(t3/nAB).

10. The method according to claim 9, further comprising the step of determining the third moment (t3) from the moment at which the second change is detected by said electronic control unit (5), and a signal transit time resulting from a temporary deceleration between an output command of said electronic control unit (5) and the reduction ratio (i(K)).

* * * * *